United States Patent
Lahlou et al.

(10) Patent No.: US 12,001,790 B2
(45) Date of Patent: Jun. 4, 2024

(54) METHODS FOR EXACT AND APPROXIMATE INVERSES OF NEURAL EMBEDDING MODELS

(71) Applicant: Capital One Services, LLC, McLean, VA (US)

(72) Inventors: Tarek Aziz Lahlou, McLean, VA (US); Nathan Wolfe, Silver Spring, MD (US); Christopher Larson, Washington, DC (US)

(73) Assignee: Capital One Services, LLC, McLean, VA (US)

(*) Notice: Subject to any disclaimer, the term of this patent is extended or adjusted under 35 U.S.C. 154(b) by 351 days.

(21) Appl. No.: 17/347,101

(22) Filed: Jun. 14, 2021

(65) Prior Publication Data

US 2022/0398377 A1    Dec. 15, 2022

(51) Int. Cl.
*G06F 40/242* (2020.01)
*G06N 3/04* (2023.01)
*G06N 3/08* (2023.01)

(52) U.S. Cl.
CPC ............ *G06F 40/242* (2020.01); *G06N 3/04* (2013.01); *G06N 3/08* (2013.01)

(58) Field of Classification Search
CPC ........... G06F 40/242; G06N 3/04; G06N 3/08
See application file for complete search history.

(56) References Cited

U.S. PATENT DOCUMENTS

| | | | |
|---|---|---|---|
| 11,176,471 B1* | 11/2021 | DeCaprio | G06F 18/2115 |
| 11,461,537 B2* | 10/2022 | Lundgaard | G06N 3/04 |
| 11,599,518 B2* | 3/2023 | Menghani | G06N 3/08 |

OTHER PUBLICATIONS

Narayan, Sanath, Akshita Gupta, Fahad Shahbaz Khan, Cees G. M. Snoek, and Ling Shao, "Latent Embedding Feedback and Discriminative Features for Zero-Shot Classification", Aug. 2020, Computer Vision—ECCV 2020: 16th European Conference, Part XXII 16, pp. 479-495. (Year: 2020).*

Carta, Antonio, and Davide Bacciu, "Sequential Sentence Embeddings for Semantic Similarity", Dec. 2019, 2019 IEEE Symposium Series on Computational Intelligence (SSCI), pp. 1354-1361. (Year: 2019).*

Tso, William W., Baris Burnak, and Efstratios N. Pistikopoulos, "HY-POP: Hyperparameter optimization of machine learning models through parametric programming", May 2020, Computers and Chemical Engineering 139 (2020) 106902, pp. 1-12. (Year: 2020).*

Cao, Yu, Liang Ding, Zhiliang Tian, and Meng Fang, "Towards Efficiently Diversifying Dialogue Generation via Embedding Augmentation", May 2021, 2021 IEEE International Conference on Acoustics, Speech and Signal Processing (ICASSP 2021), pp. 7443-7447. (Year: 2021).*

(Continued)

*Primary Examiner* — Richa Sonifrank
*Assistant Examiner* — James Boggs
(74) *Attorney, Agent, or Firm* — Banner & Witcoff, Ltd.

(57) ABSTRACT

Systems, apparatuses, and methods are described for inverting neural embeddings. One or more forward neural embeddings associated with meanings, features, and/or characteristics of data samples may be generated for one or more data samples. One or more inverse neural embeddings associated with the one or more forward neural embeddings may be determined. One or more inverse feature sets for the one or more inverse neural embeddings may be generated.

20 Claims, 6 Drawing Sheets

(56) References Cited

OTHER PUBLICATIONS

Wolfe, Cameron R., and Keld T. Lundgaard, "E-Stitchup: Data Augmentation for Pre-Trained Embeddings", Oct. 2020, arXiv preprint arXiv:1912.00772. (Year: 2020).*

Ko, Byungsoo, and Geonmo Gu, "Embedding Expansion: Augmentation in Embedding Space for Deep Metric Learning", Jun. 2020, 2020 IEEE/CVF Conference on Computer Vision and Pattern Recognition (CVPR), pp. 7253-7262. (Year: 2020).*

Abrishami, Mohammad Saeed, Amir Erfan Eshratifar, David Eigen, Yanzhi Wang, Shahin Nazarian, and Massoud Pedram, "Efficient Training of Deep Convolutional Neural Networks by Augmentation in Embedding Space", Mar. 2020, 21st International Symposium on Quality Electronic Design (ISQED), pp. 347-351. (Year: 2020).*

Wu et al. "Starspace: Embed all the things!, <https://github.com/facebookresearch/Starspace>", 9 pages, 2017, Facebook AI Research, cite arxiv: 1709.03856.

Zhmoginov et al., "Inverting face embeddings with convolutional neural networks", <https://arxiv.org/pdf/1606.04189.pdf>, pp. 1-12, 2016, arXiv preprint arXiv:1606.04189v2 (2016).

Mahendran et al., "Understanding deep image representations by inverting them" <https://www.robots.ox.ac.uk/~vedaldi/assets/pubs/mahendran15understanding.pdf>, pp. 5188-5196, In Proceedings of the IEEE conference on computer vision and pattern recognition,. 2015.

Tavakkoli et al., "A Novel Recurrent Neural Network-Based Ultra-Fast, Robust, and Scalable Solver for Inverting a Time-Varying Matrix", <https://www.mdpi.com/1424-8220/19/18/4002/pdf>, pp. 1-20, Sensors 19, No. 18 (2019): 4002.

<https://stats.stackexchange.com/questions/422430/inverse-word-embedding-vector-to-word>, 2 pages, retrieved Oct. 14, 2020.

<https://datascience.stackexchange.com/questions/15149/output-a-word-instead-of-a-vector-after-word-embedding>, 2 pages, retrieved Oct. 14, 2020.

<https://stackoverflow.com/questions/43515400/how-to-train-a-reverse-embedding-like-vec2word>, 2 pages, retrieved Oct. 14, 2020.

Hedderich "Using multi-sense vector embeddings for reverse dictionaries",, <https://arxiv.org/pdf/1904.01451.pdf>, 12 pages, arXiv preprint arXiv:1904.01451v1 (2019).

* cited by examiner

METHODS FOR EXACT AND APPROXIMATE INVERSES OF NEURAL EMBEDDING MODELS

TECHNICAL FIELD

The present disclosure is generally related to artificial intelligence systems and is specifically related to inverting neural embeddings.

BACKGROUND

Computing devices may use data samples for artificial intelligence systems, and/or for various purposes. If a set of data samples do not indicate a certain meaning, feature, and/or characteristic of interest, it may contribute to a dataset lacking understanding of the meaning, feature, and/or characteristic.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems, apparatuses, and methods are described for inverting neural embeddings. One or more forward neural embeddings associated with meanings, features, and/or characteristics of data samples may be generated for one or more data samples. One or more inverse neural embeddings associated with the one or more forward neural embeddings may be determined. One or more inverse feature sets for the one or more inverse neural embeddings may be generated.

A computing device may receive a plurality of data samples. The computing device may generate a plurality of forward neural embeddings for the plurality of data samples. Generating a forward neural embedding, of the plurality of forward neural embeddings, for a data sample of the plurality of data samples may comprise: determining a forward feature set for the data sample; and based on applying a dictionary to the forward feature set, determining the forward neural embedding for the data sample. The forward feature set may comprise a plurality of elements having non-negative integer values. The forward neural embedding may comprise a vector of one or more values. The computing device may determine one or more inverse neural embeddings associated with the plurality of forward neural embeddings. The computing device may generate one or more inverse feature sets for the one or more inverse neural embeddings. Generating an inverse feature set, of the one or more inverse feature sets, for an inverse neural embedding of the one or more inverse neural embeddings may comprise: determining a target function comprising a variable corresponding to the inverse feature set for the inverse neural embedding; and based on minimizing the target function under a constraint that each element of a plurality of elements of the inverse feature set comprises a non-negative integer value, determining the inverse feature set for the inverse neural embedding. The computing device may cause output of the one or more inverse feature sets for the one or more inverse neural embeddings.

In some examples, the plurality of data samples may comprise a plurality of words, a plurality of sentences, a plurality of documents, a plurality of utterances, a plurality of video segments, or a plurality of images.

In some examples, the dictionary may comprise a plurality of vectors. Each vector of the plurality of vectors may correspond to a different element of the plurality of elements of the forward feature set. The applying the dictionary to the forward feature set may comprise aggregating the plurality of vectors respectively multiplied by the plurality of corresponding elements of the forward feature set.

In some examples, the computing device may generate the dictionary based on: determining a vector representation for each word in a corpus of words; and adding, to the dictionary, the vector representations for the corpus of words.

In some examples, the determining the one or more inverse neural embeddings associated with the plurality of forward neural embeddings may comprise: determining an embedding space associated with the plurality of forward neural embeddings; and based on selecting one or more positions within the embedding space, determining the one or more inverse neural embeddings.

In some examples, the determining the one or more inverse neural embeddings associated with the plurality of forward neural embeddings may comprise: based on proximity to one or more forward neural embeddings of the plurality of forward neural embeddings, determining the one or more inverse neural embeddings.

In some examples, the determining the one or more inverse neural embeddings associated with the plurality of forward neural embeddings may comprise: interpolating or extrapolating based on two or more forward neural embeddings of the plurality of forward neural embeddings.

In some examples, the target function may comprise a 2-norm of a result of subtracting the inverse neural embedding by a product of the dictionary and the variable.

In some examples, the target function may comprise a 2-norm of the variable. The minimizing the target function may be under a further constraint that a 2-norm of a result of subtracting the inverse neural embedding by a product of the dictionary and the variable is less than or equal to a boundary.

In some examples, the minimizing the target function may be via a mixed-integer quadratic programming solver.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to systems, apparatuses, non-transitory computer-readable media, methods, and/or techniques for inverting neural embeddings. One or more forward neural embeddings associated with meanings, features, and/or characteristics of data samples may be generated for one or more data samples. One or more inverse neural embeddings associated with the one or more forward neural embeddings may be determined. One or more inverse feature sets for the one or more inverse neural embeddings may be generated.

Figure 1:
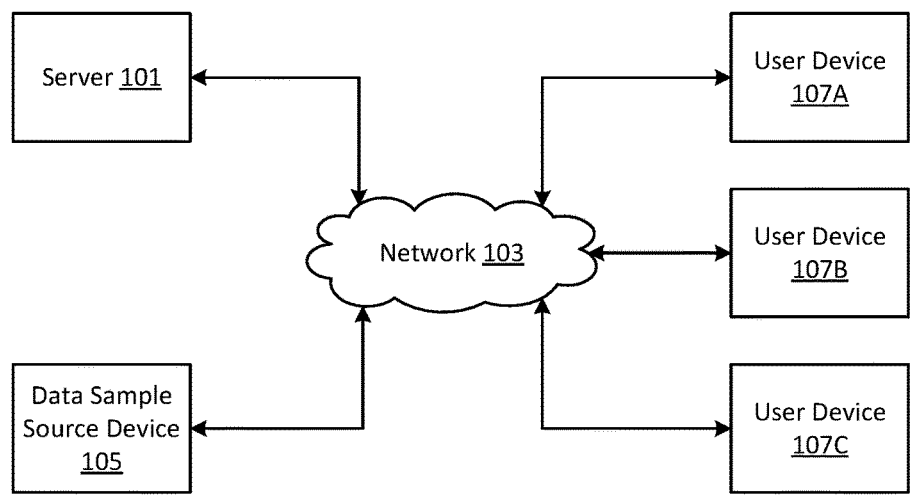
FIG. 1 is a schematic diagram showing an example system for inverting neural embeddings in which one or more aspects described herein may be implemented.

FIG. 1 is a schematic diagram showing an example system for inverting neural embeddings in which one or more aspects described herein may be implemented. The system may comprise an operating environment in which one or more aspects described herein may be implemented. The system may comprise one or more servers (e.g., server 101), one or more networks (e.g., network 103), one or more data sample source devices (e.g., data sample source device 105), and one or more user devices (e.g., user devices 107A-107C). It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

The server 101 may comprise any type of computing device. From a physical standpoint, the server 101 may be implemented as a single device (such as a single server) or as a plurality of devices (such as a plurality of distributed servers). The server 101 may be configured to generate neural embeddings for received data samples, and/or to generate inverse feature sets based on particular neural embeddings, as described herein. In some examples, the server 101 may store, train, and/or provide a variety of machine classifiers as described herein. The server 101 may comprise and/or be implemented with one or more components in a similar manner as the computing device 200.

The network 103 may comprise a single network or a collection of multiple connected networks. The network 103 may comprise one or more of any of various types of information distribution networks, such as, without limitation, a satellite network, a telephone network, a cellular network, a Wi-Fi network, an Ethernet network, an optical fiber network, a coaxial cable network, a hybrid fiber coax network, etc. The network 103 may comprise a local area network (LAN), a wide area network (WAN), a backbone network, etc. The network 103 may comprise an Internet Protocol (IP) based network (e.g., the Internet). The network 103 may comprise a plurality of interconnected communication links (e.g., to connect the server 101, the data sample source device 105, the user devices 107A-107C, and/or other devices).

The data sample source device 105 may comprise any type of computing device. The data sample source device 105 may be configured to function as a source of data samples, and to provide data samples to other devices. A data sample that may be stored and/or provided by the data sample source device 105 may comprise, for example, a word, a phrase, a sentence, a paragraph, a document, a group of words, an utterance, an audio segment, an image, a video segment, a collection of data, and/or the like. The data sample source device 105 may be configured to, for example, provide data samples to the server 101 and/or the user devices 107A-107C. The data sample source device 105 may exchange data with the user devices 107A-107C, provide training data to the server 101, provide input data to the server 101 for processing (e.g., generating neural embeddings for data samples, inverting neural embeddings to feature sets, classifying the data, and/or the like), and/or obtain processed data from the server 101 as described herein. The data sample source device 105 may comprise and/or be implemented with one or more components in a similar manner as the computing device 200.

A user device of the user devices 107A-107C may comprise any type of computing device. The user device may comprise, for example, a smartphone, a cell phone, a mobile communication device, a personal computer, a server, a tablet, a desktop computer, a laptop computer, a gaming device, a virtual reality headset, or any other type of computing device. The user device may provide data, and/or interact with a variety of neural embedding generating functionalities, neural embedding inverting functionalities, machine classifiers, and/or the like, as described herein. For example, a user device of the user devices 107A-107C may be configured to allow a user (e.g., a human labeler) to label data samples (e.g., via a user interface). The labeling information from the user device (e.g., indicating the associations of data samples and assigned labels) may be sent to the server 101. In some examples, the user device may be configured to generate data samples (e.g., text messages, images, audio segments, video segments, etc.), and may be configured to send the data samples to the server 101 and/or the data sample source device 105. In some examples, the user device may be configured to display (e.g., via a user interface) indications of spatial relationships among data samples (and/or feature sets), wherein the spatial relationships may be based on the neural embeddings generated for the data samples (and/or feature sets). The user device may be configured to allow a user to input (e.g., via a user interface) indications of particular neural embeddings for inverting to feature sets, as described herein. The user device may interact with one or more devices (e.g., the server 101, the data sample source device 105, other user devices, etc.) as described herein. The user device may comprise and/or be implemented with one or more components in a similar manner as the computing device 200.

It should be noted that any computing device in the operating environment as shown in FIG. 1 may perform any of the processes and/or store any data as described herein. The data sample source device 105 and/or the server 101 may be publicly accessible and/or have restricted access. Access to a particular system may be limited to particular devices. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. The network 103 may include a local area network (LAN), a wide area network (WAN), a wireless telecommunications network, and/or any other communication network or combination thereof.

The data transferred to and from various computing devices in the operating environment as shown in FIG. 1 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In some examples, one or more web services may be implemented within the various computing devices. Web services may be accessed by authorized external devices and users to support input, extraction, and manipulation of data between the various computing devices in the operating environment. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the operating environment shown in FIG. 1 in front of one or more computing devices such that any external devices may communicate directly with the specialized hardware.

The server 101 may store one or more datasets comprising data samples and neural embeddings for the data samples. A neural embedding for a data sample may comprise, for example, a vector representing the data sample. For example, if the vector comprises three numeric values, the vector may be indicated as a point in a three-dimensional space, and the data sample as represented by the point in the three-dimensional space may have spatial relationships indicated with other data samples as represented by other points in that space. The spatial relationships may indicate, for example, semantic relationships, meaning relationships, feature relationships, characteristic relationships, and/or the like, among the data samples. For example, data samples that are closer in that space may be more similar in meaning. The one or more datasets may be used for showing spatial relationships among different data samples, training artificial intelligence systems (e.g., neural networks), and/or the like. In some examples, data samples in the one or more datasets may be additionally or alternatively assigned with labels for training artificial intelligence systems. In some examples, neural embeddings may be processed by artificial intelligence systems for various purposes.

The server 101 may be configured to update the datasets, for example, with new data samples and corresponding neural embeddings. For example, the server 101 may receive new data samples (e.g., from the data sample source device 105, the user devices 107A-107C, etc.), and may generate neural embeddings for the received new data samples. The datasets may be updated with the received new data samples and the neural embeddings generated for the new data samples. If the new data samples are similar to (e.g., are similar in meaning to, have close spatial relationships to, etc.) the incumbent data samples already in the datasets, and/or if the neural embeddings of the data samples (e.g., including the incumbent data samples and/or the new data samples) do not cover one or more areas of interest in the embedding space, it may contribute to a compromised understanding of the embedding space, and/or may contribute to the datasets lacking data samples of interest and/or being less comprehensive (e.g., for purposes of training artificial intelligence systems).

Inverting neural embeddings may help alleviate the challenges discussed above. A computing device (e.g., the server 101) may receive data samples, and may determine feature sets for the received data samples. A feature set for a data sample may, for example, indicate, for each constituent element of a corpus of constituent elements, a quantity (e.g., 0, 1, 2, 3, etc.) of instances of the constituent element in the data sample. Based on applying to the determined feature sets a neural embedding dictionary or model comprising a neural embedding for each constituent element of the corpus of constituent elements, the computing device may generate neural embeddings for the received data samples. The computing device may determine one or more neural embeddings, associated with the generated neural embeddings, for inverting. The one or more inverse neural embeddings may be selected from an embeddings space of the generated neural embeddings. The computing device may generate one or more inverse feature sets for the one or more inverse neural embeddings. For example, for an inverse neural embedding, the computing device may determine a target function comprising a variable corresponding to an inverse feature set for the inverse neural embedding. Based on minimizing the target function under one or more constraints (e.g., under a constraint that each element of a plurality of elements of the inverse feature set may comprise a non-negative integer value), the computing device may determine the inverse feature set for the inverse neural embedding. The inverse feature set may indicate what constituent element(s) and how many instances of each of the constituent element(s) may be included in a data sample having the inverse neural embedding and/or having a neural embedding that may be substantially approximate to the inverse neural embedding. More details regarding inverting neural embeddings are described below (e.g., in connection with FIGS. 3A-3B).

In some examples, exact and/or approximate inverses of neural embedding models may be determined. Neural embedding models may be useful across a broad range of tasks and applications, such as text classification (e.g., intent or sentiment), image classification, recommendations (e.g., collaborative filtering on documents), music or videos, content-based recommendations (e.g., natural language generation), graph embeddings (e.g., multi-relational graphs), learning word, sentence, or document embeddings, and/or the like.

Neural embeddings may comprise vector representations of entities. Entities may be described via countable sets of discrete features from fixed-length dictionaries. For example, $F \in R^{d \times D}$ may denote the matrix representation of one such dictionary comprising D features each represented by a d-dimensional vector. The symbol R may indicate the set of real numbers. The i-th feature of F is then the d-dimensional vector denoted by $F_i$. Learning neural embeddings, and the appropriate selections of a matrix F, may comprise a task based on techniques of supervised, unsupervised, semi-supervised learning, and/or the like. As described herein, the neural embedding model, encapsulated by the matrix F, may be defined based on the techniques.

The neural embedding of an entity $\alpha$, which may itself be a document, video, image, etc., may be the d-dimensional vector A generated according to the following equation:

$$A = \sum_{i \in \alpha} F_i \quad (1)$$

In the equation (1), the notation $i \in \alpha$ may indicate the set of all features associated with the entity $\alpha$. Expressing the equation (1) in matrix form, the d-dimensional vector A may also be produced according to the following equation:

$$A = Fx(\alpha) \quad (2)$$

In the equation (2), $x(\alpha)$ may be a non-negative, D-dimensional, integer-valued vector encoding the set $i \in \alpha$, and/or may be a feature set of the entity $\alpha$.

Deconstructing the feature set x(t) given a particular (e.g., arbitrary) vector $T \in R^d$ by treating T as a neural embedding vector associated with an entity t is described herein. This process may include and/or be part of neural embedding inversion.

For a neural embedding model F, the set of achievable embeddings across all possible entities according to the equation (1) or the equation (2) may be a discrete, countably infinite set of points in $R^d$. Therefore, for a particular (e.g., arbitrary) vector T, the feature set x(t) may or may not exist. Thus, exact and/or approximate inverses may be determined. In some examples, based on the properties discussed above, both exact and approximate inverses may be computed.

In some examples, if an exact feature set of the inverse process exists, the exact feature set may be provided by the following equation:

$$x^*(t) = F^+ T \quad (3)$$

In the equation (3), x*(t) may comprise the exact feature set based on the vector T, $(\bullet)^+$ may indicate the Moore-Penrose pseudoinverse, and $F^+$ may indicate the Moore-Penrose pseudoinverse of the neural embedding library or model F. Conditions for an exact inverse feature set to exist may comprise: the embedding T may need to be in the range of F; and the solution in the equation (3) may need to be non-negative and integer valued. In some examples, these conditions in applications of neural embedding models might not be met despite the scenario where D may be much larger than d, i.e., the size of the dictionary may be much larger than the embedding dimension. This scenario may help satisfy the first condition while making the second condition less likely in many examples because over the infinite space of possible solutions the expression may identify the least-squares one which may be non-integer valued.

In some examples, for inverting neural embeddings, and based on the equation (3) and the explicit enforcement of the conditions, optimization programs may be formulated to identify solutions. In some examples, the optimization programs may be used independent of whether an exact solution or approximate solution may be requested.

For example, a mixed integer quadratic program may be used attempting to identify the inverse feature set x that, when applied to by the neural embedding library F, may produce the closest approximation of T while satisfying the non-negative and integer constraints, according to the following expressions:

$$\|T - Fx\| \quad (4)$$

$$s.t. \ x_k \in N_0 \quad (5)$$

In the expressions (4) and (5), $\|T-Fx\|$ may indicate the norm (e.g., 2-norm) of T–Fx, $x_k$ may indicate any element (e.g., the k-th element) of the inverse feature set x, and the symbol $N_0$ may indicate the set of non-negative integers (e.g., 0, 1, 2, 3, etc.). The inverse feature set x may be calculated based on identifying the inverse feature set x such that $\|T-Fx\|$ may be minimized, under the constraint that each element of the inverse feature set x may comprise a non-negative integer value.

In some examples, a mixed integer quadratic program may be used attempting to identify an approximate solution x(t) with the fewest features also satisfying the non-negative and integer constraints according to the following expressions:

$$\|x\| \quad (6)$$

$$s.t. \ x_k \in N_0 \quad (7)$$

$$\|T - Fx\| \leq \epsilon \quad (8)$$

In the constraint (8), $\epsilon$ may bound the value of $\|T-Fx\|$, and thus bound the feasible set of approximations of the inverse feature set x. In some examples, $\epsilon$ may be set by an administrator. In some examples, $\epsilon$ may be set based on minimized value(s) of $\|T-Fx\|$ as determined according to the expressions (4) and (5). For example, $\epsilon$ may be adjusted to be larger by a particular degree than the minimized value(s) of $\|T-Fx\|$ as determined according to expressions (4) and (5), so that one or more candidate solutions of the inverse feature set x (in addition to the solution, of the inverse feature set x, that may minimize $\|T-Fx\|$) may be considered for determining a version of the inverse feature set x with the fewest features (e.g., with $\|x\|$ minimized).

Solving the optimization programs may be accomplished using any type of mixed integer programming solvers. In some examples, if the norm $\|\bullet\|$ is selected to be the 2-norm (e.g., in the expressions (4), (5), (6), (7), and/or (8)), mixed integer quadratic programming solvers may be used, and may be faster than generic integer programming solvers. The examples for inverting neural embeddings as described herein may be applicable to word embeddings, n-grams, text classification, etc.

Figure 2:
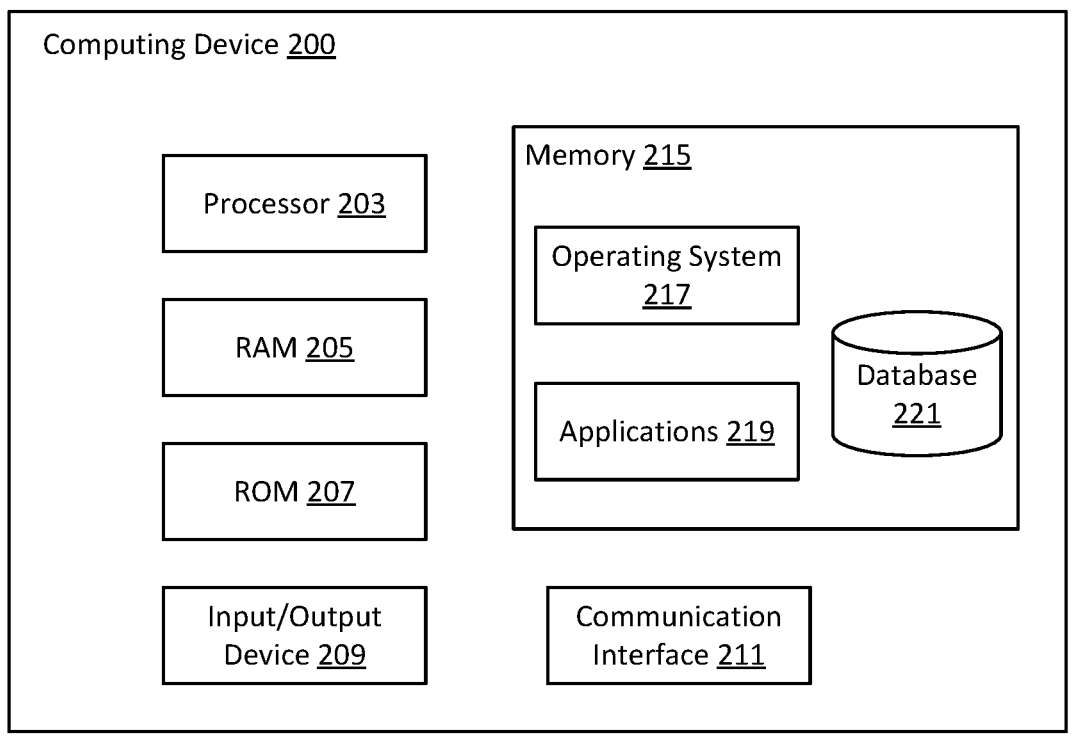
FIG. 2 shows an example computing device in accordance with one or more aspects described herein.

Turning now to FIG. 2, a conceptual illustration of a computing device 200 that may be used to perform any of the techniques as described herein is shown. Hardware elements of the computing device 200 may be used to implement any of the computing devices discussed herein. Hardware elements of the computing device 200 may be used to implement any of the computing devices shown in FIG. 1 (e.g., the server 101, the data sample source device 105, the user devices 107A-107C, and/or other devices) and/or any other computing devices discussed herein. The computing device 200 may be used to implement any of the processes, methods, components, and/or functionalities as discussed herein (e.g., as described in connection with FIGS. 3A, 3B, 4, 5).

The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the scope of the disclosure provided herein.

Figure 3A:
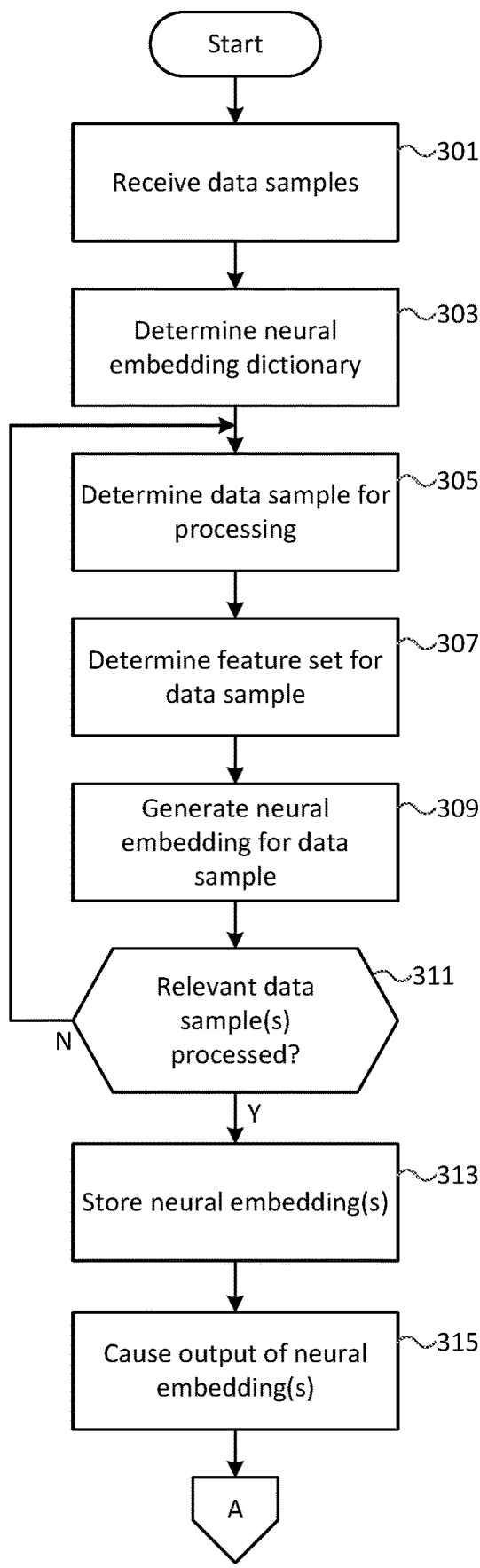
FIGS. 3A-3B show a flowchart of an example method for inverting neural embeddings in accordance with one or more aspects described herein.
Figure 3B:
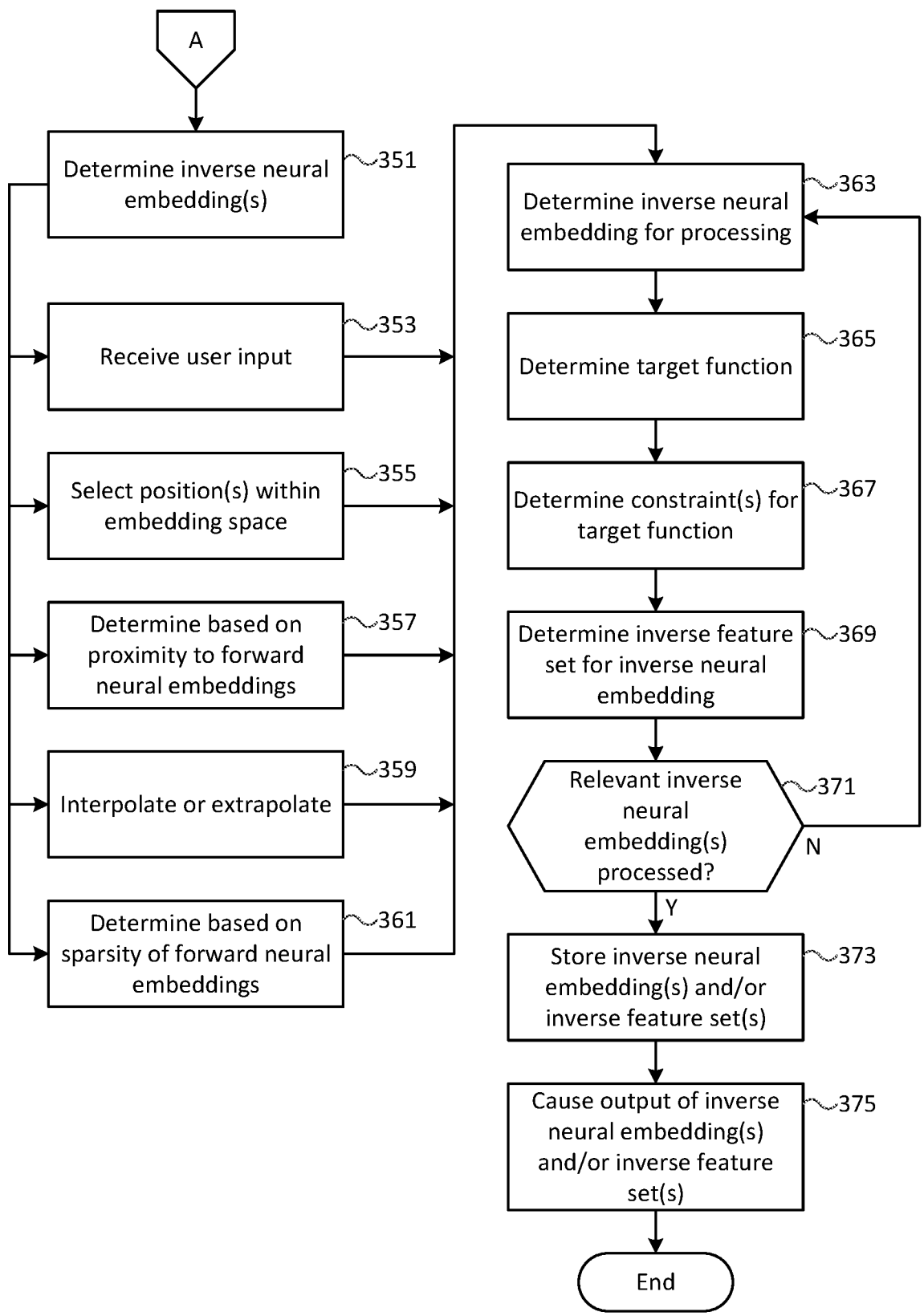

FIGS. 3A-3B show a flowchart of an example method for inverting neural embeddings in accordance with one or more aspects described herein. The method may be implemented or performed, for example, by one or more of the systems as discussed in connection with FIG. 1 (e.g., the server 101, the data sample source device 105, or one or more of the user devices 107A-107C). The method may be implemented or performed, for example, by one or more of the computing devices 200 as discussed in connection with FIG. 2. The steps of the method may be described as being performed by particular components and/or computing devices for the sake of simplicity, but the steps may be performed by any component and/or computing device, or by any combination of one or more components and/or one or more computing devices. The steps of the method may be performed by a single computing device or by multiple computing devices. One or more steps of the method may be omitted, added, rearranged, and/or otherwise modified as desired by a person of ordinary skill in the art.

In step 301, a computing device (e.g., the server 101) may receive data samples. The data samples may be received, for example, from one or more data sample source devices (e.g., the data sample source device 105) and/or from one or more user devices (e.g., the user devices 107A-107C). A data sample may comprise, for example, a word, a phrase, a sentence, a paragraph, a document, a group of words, an utterance, an audio segment, an image, a video segment, a collection of data, and/or the like. The received data samples may be processed, and neural embeddings for the data samples may be generated, as described in greater detail below.

In step 303, the computing device may determine a neural embedding dictionary. The neural embedding dictionary may include and/or be part of a neural embedding model. The neural embedding dictionary may be determined, for example, for the data samples as received in step 301. The neural embedding dictionary may comprise, for example, a plurality of neural embeddings for a corpus of constituent elements. Each constituent element of the corpus of constituent elements may have a corresponding neural embedding in the neural embedding dictionary.

The corpus of constituent elements may be a basis for forming data samples. In some examples, the corpus of constituent elements may be specific to a particular type of data sample. For example, a corpus of constituent elements for data samples of a sentence type may comprise words that may be used to form sentences. A corpus of constituent elements for data samples of an utterance type may comprise utterance segments that may be used to form utterances, wherein each of the utterance segments may, for example, correspond to a word. A corpus of constituent elements for data samples of an image type (and/or video type) may comprise pixels that may be used to form images (and/or videos), wherein the pixels may be identified, for example, by different values of a color model (e.g., the RGB color model). In some examples, a set of features (e.g., textual labels) may be determined for an image and/or video (e.g., by extracting features from the image and/or video, by labeling the image and/or video with labels, and/or the like), and a corpus of constituent elements for images and/or videos may comprise a corpus of features that may be used to describe images and/or videos. In some examples, the corpus of constituent elements may be associated with a combination of multiple types of data samples. For example, features of images and/or videos may be extracted, and represented by textual labels (e.g., words). The images and/or videos may, based on their textual labels, share a corpus of constituent elements (e.g., words) with, for example, sentences.

Each neural embedding of the plurality of neural embeddings of the neural embedding dictionary may comprise a vector representing a particular constituent element, of the corpus of constituent elements, corresponding to the neural embedding. The vector may comprise one or more values (e.g., real number values). For example, such a vector with three values may be in the form of [x, y, z]. Each of x, y, and z of the vector may comprise, for example, a real number. An embedding space of the plurality of neural embeddings of the neural embedding dictionary may be defined, and the corpus of constituent elements may be mapped to the embedding space. For example, the embedding space may comprise a three-dimensional real-number metric space (e.g., for a type of neural embedding vector comprising three real numbers, such as in the form of [x, y, z]). In some examples, the embedding space may comprise one or more limited ranges in one or more dimensions. In some examples, the embedding space may have one or more unlimited ranges in one or more dimensions.

The neural embedding dictionary for a corpus of constituent elements may be determined based on various techniques, such as supervised learning, unsupervised learning, semi-supervised learning, and/or the like. For example, the neural embedding dictionary may be generated using probabilistic models, dimensionality reduction techniques, neural networks, explainable knowledge base methods, etc. In some examples, the neural embedding dictionary may comprise word embeddings. In some examples, the neural embedding dictionary may be generated based on various types of techniques (e.g., Word2vec, GloVe, etc.). The neural embedding dictionary may be determined and/or used in a similar manner as the neural embedding dictionary F as described above in connection with one or more of the equations and/or expressions (1)-(8).

In step 305, the computing device may determine, from the data samples as received in step 301, a data sample for processing. One or more data samples, of the data samples as received in step 301, may be selected to be processed to generate the corresponding neural embedding(s). In some examples, the selection of the one or more data samples may be performed by an administrator, based on one or more criteria (e.g., a timestamp of the data sample, a device that generated the data sample, application software that generated the data sample, etc.), and/or in some other manners. The computing device may, for example, sequentially determine each of the one or more data samples for processing. The determined data sample may be processed in a similar manner as the entity $\alpha$ as described above in connection with the equations (1) and/or (2).

In step 307, the computing device may determine a feature set for the data sample (e.g., as determined in step 305). The feature set for the data sample may, for example, indicate, for each constituent element of the corpus of constituent elements associated with the neural embedding dictionary (e.g., as determined in step 303), a quantity (e.g., 0, 1, 2, 3, etc.) of instances of the constituent element in the data sample. The computing device may determine, based on the data sample, the feature set. For example, the computing device may count how many times a particular constituent element is present in the data sample. If a constituent element is not present in the data sample, a count of zero (0) may be indicated for that constituent element. For example, if the corpus of constituent elements comprises words {a, analyze, and, anger, . . . }, and the data sample comprises a sentence "a first tree and a second tree are over there," the feature set for the data sample may comprise a plurality of non-negative integer values {2, 0, 1, 0, . . . }, because the word "a" is present two (2) times in the data sample, the word "analyze" is not present in the data sample, the word "and" is present one (1) time in the data sample, the word "anger" is not present in the data sample, and so forth. The feature set for the data sample may be determined and/or processed in a similar manner as the feature set $x(\alpha)$ as described above in connection with the equation (2).

In step 309, the computing device may generate a neural embedding for the data sample (e.g., as determined in step 305). The neural embedding may be generated based on the neural embedding dictionary (e.g., as determined in step 303) and/or the feature set (e.g., as determined in step 307) for the data sample. For example, the computing device may generate the neural embedding by applying the neural embedding dictionary to the feature set. A neural embedding, for each constituent element of the corpus of constituent elements, in the neural embedding dictionary may be multiplied by a quantity, of instances of the constituent element in the data sample, as indicated in the feature set, and a result may be produced by the multiplication. The neural embedding for the data sample may correspond to a sum of the multiplication results for the corpus of constituent elements. For example, if, based on a corpus of constituent elements comprising words {a, analyze, and, anger, . . . }, the feature set for the data sample comprises a plurality of non-negative integer values {2, 0, 1, 0, . . . }, and the neural embeddings for the constituent element words "a," "analyze," "and," "anger," etc., are respectively vectors [3.6, 5.5, 9.8], [5.9, −4.9, 3.2], [−1.2, 0.5, 2.3], [50.1, 40.2, 87.8], etc., then the generated neural embedding for the data sample may comprise a vector [l, m, n] corresponding to the sum of [3.6, 5.5, 9.8] multiplied by 2, [5.9, −4.9, 3.2] multiplied by 0, [−1.2, 0.5, 2.3] multiplied by 1, [50.1, 40.2, 87.8] multiplied by 0, and so forth. The neural embedding for the data sample may be determined and/or generated in a similar manner as the neural embedding A as described above in connection with the equations (1) and/or (2).

In step 311, the computing device may determine whether relevant data sample(s) are processed. For example, one or more data samples, of the data samples as received in step 301, may be selected to be processed to generate the corresponding neural embedding(s). The computing device may, for example, sequentially determine each of the one or more data samples for processing. If relevant data sample(s) are processed (step 311: Y), the method may proceed to step 313. If relevant data sample(s) are not processed (step 311: N), the method may repeat step 305. In step 305, the computing device may determine (e.g., from the one or more selected data samples) a next data sample for processing.

In step 313, the computing device may store neural embedding(s) as generated for one or more of the data samples received in step 301. The neural embedding(s) may be stored in a database of the computing device. In some examples, the neural embedding(s) may be stored in connection with their corresponding data sample(s). For example, a pair of a data sample and the neural embedding generated for the data sample may be stored by the computing device.

In step 315, the computing device may cause output of neural embedding(s) (e.g., as generated and/or stored for one or more of the data samples received in step 301). In some examples, the computing device may send, to another device (e.g., a device associated with an administrator, a user device, etc.), the data-sample-neural-embedding pairs. In some examples, the computing device may cause display (e.g., via a user interface) of data samples and their corresponding neural embeddings. For example, the computing device may list, on a user interface, each data sample and the neural embedding corresponding to the data sample. In some examples, the computing device may cause display of data samples and neural embeddings corresponding to the data samples, with indications of spatial relationships among the data samples. For example, a coordinate system defining a three-dimensional space may be displayed. One or more points representing one or more data samples may be displayed in the three-dimensional space. The position of each point of the one or more points in the three-dimensional space may be based on the neural embedding of the data sample represented by the point. The data (e.g., a pair of a data sample and a neural embedding for the data sample) for each point may be displayed together with the point, or upon activating (e.g., clicking, hovering over, etc.) the point. More details regarding a display of neural embeddings are described below in connection with FIG. 5.

In step 351 (FIG. 3B), the computing device may determine one or more inverse neural embeddings. The one or more inverse neural embeddings may be determined for processing (e.g., for generating one or more inverse features sets). The one or more inverse neural embeddings may be determined in various manners, such as based on receiving user input (as described in greater detail below in connection with step 353), based on selecting one or more positions within an embedding space (as described in greater detail below in connection with step 355), based on proximity to forward neural embeddings (as described in greater detail below in connection with step 357), based on interpolating or extrapolating (as described in greater detail below in connection with step 359), based on sparsity of forward neural embeddings (as described in greater detail below in connection with step 361), and/or in one or more additional or alternative manners as desired by a person of ordinary skill in the art. In some examples, one of the various processes for determining inverse neural embedding(s) for processing may be performed. In some examples, two or more of the various processes may be performed, for example, in parallel, in series, and/or in combination for determining inverse neural embedding(s) for processing. As described below, one or more of the various processes may be based on forward neural embeddings (e.g., generated for received data samples, as discussed in connection with step 309). Additionally or alternatively, the one or more of the various processes may be similarly based on any previously determined inverse neural embeddings and corresponding previously generated inverse feature sets.

In step 353, the computing device may receive user input for determining one or more inverse neural embeddings. The user input may be received, for example, from a device associated with a user, an administrator, etc. The user input may indicate, for example, one or more inverse neural embeddings for processing. For example, a user may enter, via a user interface, the values for one or more inverse neural embeddings, and that data may be sent to the computing device. Processed data samples and their respective forward neural embeddings (e.g., the data samples and the neural embeddings generated for the data samples as described above in connection with step 309) may be presented to the user during the user's entering of the values, so that the user may reference the data samples and the forward neural embeddings respectively for the data samples. In some examples, if inverse neural embeddings and inverse feature sets generated for the inverse neural embeddings were previously determined, the data may be similarly presented to the user during the user's entering of the values.

In some examples, a coordinate system defining a space (e.g., one-dimensional, two-dimensional, three-dimensional, etc.) may be displayed via a user interface to a user, and the user may, based on the coordinate system, select one or more positions within the space. The selected one or more positions, based on the coordinate system, may indicate the values for one or more inverse neural embeddings. In some examples, processed data samples and their respective forward neural embeddings (e.g., the data samples and the neural embeddings generated for the data samples as described above in connection with step 309) and/or any previously determined inverse neural embeddings and their respective generated inverse feature sets may be indicated as reference points in the space defined by the coordinate system via the user interface, during the user's selection the one or more positions. The data (e.g., a pair of a data sample and a corresponding forward neural embedding, or a pair of an inverse neural embedding and a corresponding inverse feature set) for each reference point may be displayed together with the reference point, or upon activating (e.g., clicking, hovering over, etc.) the reference point.

In step 355, the computing device may select one or more positions within an embeddings space. The selected one or more positions, based on the embedding space, may indicate one or more inverse neural embeddings for processing. The embedding space may be based on the forward neural embeddings of processed data samples (e.g., the neural embedding(s) generated for one or more of the received data samples, as described in connection with step 309). For example, for a type of forward neural embedding comprising a vector having three real number values, the embedding space may comprise a three-dimensional real-number metric space. In some examples, the embedding space may comprise one or more limited ranges in one or more dimensions.

In some examples, the embedding space may have one or more unlimited ranges in one or more dimensions.

In some examples, the computing device may randomly or arbitrarily select one or more positions within the embedding space. In some examples, the computing device may select one or more positions from areas of interest within the embedding space. The areas of interest may be set by an administrator. In some examples, the computing device may select one or more positions from areas, within the embedding space, where potential forward neural embeddings are more likely to be present (e.g., than a threshold likelihood). For example, if potential forward neural embeddings generated based on data samples are less likely to be present beyond a threshold distance to a fixed point of reference (e.g., the origin) of the embedding space, the computing device may select the one or more positions within the threshold distance to the fixed point of the embedding space.

In step 357, the computing device may determine, based on proximity to forward neural embeddings, one or more inverse neural embeddings for processing. The forward neural embeddings may comprise, for example, the neural embedding(s) generated for one or more of the received data samples, as described in connection with step 309. The computing device may, for example, determine one or more inverse neural embeddings that each may have a particular distance to a forward neural embedding. Additionally or alternatively, the computing device may determine one or more inverse neural embeddings that each may have a distance to each of the forward neural embeddings greater than a first threshold distance. Additionally or alternatively, each inverse neural embedding of the one or more inverse neural embeddings may have a distance to each other inverse neural embedding of the one or more inverse neural embeddings greater than a second threshold distance (which may be same as or different from the first threshold distance). In some examples, coverage of areas and/or positions in the embedding space may be expanded from forward neural embeddings to their surrounding areas via the determined inverse neural embedding(s).

In step 359, the computing device may interpolate or extrapolate for determining one or more inverse neural embeddings for processing. For example, the computing device may select two forward neural embeddings (e.g., based on user input, based on a distance between the two forward neural embeddings, and/or the like). The computing device may determine one or more positions in the embedding space based on interpolating or extrapolating based on the two forward neural embeddings. In some examples, the computing device may interpolate or extrapolate based on multiple forward neural embeddings. The determined one or more positions in the embedding space may indicate one or more inverse neural embeddings for processing. For example, a forward neural embedding for the data sample sentence "the food is delicious" and a forward neural embedding for the data sample sentence "the food is unpalatable" may be selected. A position in the embedding space between (e.g., at the middle of) the two forward neural embeddings may be determined based on interpolating, and the position may indicate the values for an inverse neural embedding for generating an inverse feature set. For example, a forward neural embedding for the data sample sentence "the food is good" and a forward neural embedding for the data sample sentence "the food is ok" may be selected. A position in the embedding space at either side beyond the section between the two forward neural embeddings may be determined based on extrapolating, and the position may indicate the values for an inverse neural embedding for generating an inverse feature set.

In step 361, the computing device may determine, based on sparsity of forward neural embeddings, one or more inverse neural embeddings for processing. For example, the computing device may measure the density of forward neural embeddings in different areas of the embedding space. The computing device may select one or more positions from an area, of the embedding space, with a density of forward neural embeddings not satisfying a threshold density and/or from an area with a density of forward neural embeddings less than a density of forward neural embeddings of each of one or more other areas. The selected one or more positions may indicate the values for one or more inverse neural embeddings for processing. Selecting the one or more positions from areas, of the embedding space, that are less dense in terms of including forward neural embeddings may help enrich neural embedding datasets and/or help understand those areas of the embedding space.

In step 363, the computing device may determine an inverse neural embedding for processing. For example, the computing device may be configured to process the one or more inverse neural embeddings (e.g., as determined in step 351). The computing device may, for example, sequentially determine each of the one or more inverse neural embeddings for processing. The determined inverse neural embedding may be formulated, configured, and/or processed in a similar manner as the vector T as described above in connection with one or more of the equations and/or expressions (3)-(8).

In step 365, the computing device may determine a target function for generating an inverse feature set for the inverse neural embedding (e.g., as determined in step 363). The target function may comprise a variable corresponding to the inverse feature set for the inverse neural embedding. The inverse feature set that may be determined and/or generated may indicate what constituent element(s) and how many instances of each of the constituent element(s) may be included in a data sample having the inverse neural embedding and/or having a neural embedding that may be substantially approximate to the inverse neural embedding. The inverse feature set may be in a similar format as a forward feature set (e.g., a feature set determined based on a data sample, as described in connection with step 307). The inverse feature set may be formulated, determined, and/or processed in a similar manner as the feature set x(t) and/or x as described above in connection with one or more of the equations and/or expressions (3)-(8).

In step 367, the computing device may determine one or more constraints for the target function. The one or more constraints for the target function may comprise a constraint that each element of a plurality of elements of the variable and/or the inverse feature set comprises a non-negative integer value.

In step 369, the computing device may determine the inverse feature set for the inverse neural embedding. The determining of the inverse feature set may be based on minimizing the target function under the one or more constraints for the target function. The computing device may perform processes to identify an instance of the variable of the target function under the one or more constraints, such that the value of the target function may comprise a minimized value. Optimization methods, such as optimization software (e.g., CPLEX, GUROBI, etc.) may be used to solve optimization problems based on the target function under the one or more constraints for determining the inverse feature set for the inverse neural embedding.

In some examples, the computing device may determine that the target function (e.g., a first target function) may comprise a 2-norm of a result of subtracting the inverse neural embedding by a product of the neural embedding dictionary (e.g., as described in connection with step 303) and the variable. The target function may have a constraint that each element of a plurality of elements of the variable and/or the inverse feature set comprises a non-negative integer value. Such a target function and its constraint(s) may be formulated, configured, processed, and/or executed in a similar manner as the target function and constraint(s) as described above in connection with expressions (4)-(5).

In some examples, the computing device may determine that the target function (e.g., a second target function) may comprise a 2-norm of the variable (corresponding to the inverse feature set). The target function may have a constraint that each element of a plurality of elements of the variable and/or the inverse feature set comprises a non-negative integer value. The target function may have a further constraint that a 2-norm of a result of subtracting the inverse neural embedding by a product of the neural embedding dictionary (e.g., as described in connection with step 303) and the variable is less than or equal to a boundary. Such a target function and its constraint(s) may be formulated, configured, processed, and/or executed in a similar manner as the target function and constraint(s) as described above in connection with expressions (6)-(8).

The boundary may bound the value of the 2-norm of the result of subtracting the inverse neural embedding by the product of the neural embedding dictionary and the variable (which formulation based on the 2-norm may, for example, correspond to the first target function). The boundary may bound the feasible set of approximations of the inverse feature set. In some examples, the boundary may be set by an administrator. In some examples, the boundary may be set based on minimized value(s) of the first target function. The computing device may be configured to set the boundary of the constraint associated with the second target function based on processing the first target function (e.g., on the inverse neural embedding and/or other inverse neural embeddings) and determining the minimized value(s) of the first target function (e.g., for the inverse neural embedding and/or other inverse neural embeddings). The boundary of the constraint associated with the second target function may be adjusted to be larger by a particular degree than the minimized value(s) of the first target function, so that one or more candidate solutions of the inverse feature set (in addition to the solution, of the inverse feature set, that may minimize the first target function) may be considered for determining a version of the inverse feature set with the fewest features (e.g., with the second target function minimized). The boundary may be determined and/or used in a similar manner as the parameter $\epsilon$ as described above in connection with expression (8).

In some examples, one target function may be used for determining the inverse feature set for the inverse neural embedding, and the one target function may be selected from the first target function, the second target function, or any other type of target function (with associated constraint(s)). In some examples, multiple target functions may be used for determining the inverse feature set for the inverse neural embedding. For example, the first target function, the second target function, and/or any other type of target function (with associated constraint(s)) may be used, for example, in parallel, in series, and/or in combination for determining the inverse feature set for the inverse neural embedding. For example, the first target function may be used if closer approximation, of a potential neural embedding generated based on the inverse feature set, to the inverse neural embedding is prioritized. The second target function may be used, for example, if having fewer features in the inverse feature set is prioritized over the closer approximation, of a potential neural embedding generated based on the inverse feature set, to the inverse neural embedding. In some examples, the computing device may use the first target function to determine a first version of the inverse feature set, and then may use the second target function to determine a second version of the inverse feature set, wherein the first version may be same as or different from the second version, and wherein the boundary of the constraint of the second target function may be configured based on (e.g., configured to be larger by a threshold degree than) minimized value(s) of the first target function (e.g., when used for the inverse neural embedding and/or other inverse neural embeddings).

Solving the optimization programs (e.g., the first target function with its constraint(s), the second target function with its constraint(s), and/or other target functions with constraints) may be performed using any type of optimization method, such as mixed integer programming solvers. In some examples, the norm formulated in the first target function, the first target function's constraint(s), the second target function, and/or the second target function's constraint(s) may be the 2-norm, and mixed integer quadratic programming solvers may be used for solving the optimization program(s) of the target function(s). In some examples, the norm formulated in the first target function, the first target function's constraint(s), the second target function, and/or the second target function's constraint(s) may be any other type of norm, and corresponding programming solvers may be used for solving the optimization program(s) of the target function(s), as desired by a person of ordinary skill in the art.

Additionally or alternatively, the computing device may determine the inverse feature set for the inverse neural embedding, based on attempting to determine an exact inverse feature set for the inverse neural embedding. The computing device may calculate the Moore-Penrose pseudoinverse of the neural embedding library (e.g., as determined in step 303). The computing device may multiply the Moore-Penrose pseudoinverse of the neural embedding library and the inverse neural embedding. The processes may be formulated, determined, implemented, and/or performed in a similar manner as the processes as described above in connection with the equation (3). The computing device may determine whether each element of a plurality of elements of the result of the multiplication comprises a non-negative integer value. If each element of the plurality of elements of the result of the multiplication comprises a non-negative integer value, then the result of the multiplication may be the exact inverse feature set for the inverse neural embedding. If any element of the plurality of elements of the result of the multiplication does not comprise a non-negative integer value, then the result of the multiplication might not be the exact inverse feature set for the inverse neural embedding, and the exact inverse feature set for the inverse neural embedding might not be able to be determined using the processes based on the Moore-Penrose pseudoinverse, because the output of the processes performed for the inverse neural embedding does not satisfy the condition that each element of a plurality of elements of the inverse feature set for the inverse neural embedding comprises a non-negative integer value.

In step 371, the computing device may determine whether relevant inverse neural embedding(s) are processed. For example, the computing device may be configured to process the one or more inverse neural embeddings (e.g., as determined in step 351). The computing device may, for example, sequentially determine each of the one or more inverse neural embeddings for processing. If relevant inverse neural embedding(s) are processed (step 371: Y), the method may proceed to step 373. If relevant inverse neural embedding(s) are not processed (step 371: N), the method may repeat step 363. In step 363, the computing device may determine (for example, from the one or more inverse neural embeddings (e.g., as determined in step 351)) a next inverse neural embedding for processing.

In step 373, the computing device may store inverse neural embedding(s) and/or inverse feature set(s). For example, the computing device may store the one or more inverse neural embeddings (e.g., as determined in step 351) and the inverse feature set(s) as generated, in step 369, for the one or more inverse neural embeddings. The data may be stored in a database of the computing device. In some examples, each inverse neural embedding and the corresponding inverse feature set may be stored as a pair. The particular processes used to generate the inverse feature set based on the inverse neural embedding (e.g., processes based on the first target function, processes based on the second target function, processes based on the Moore-Penrose pseudoinverse, processes based on any other function, etc.) may be indicated and/or stored in connection with the pair and/or the member(s) of the pair. In some examples, multiple versions of the inverse feature set may be generated for the inverse neural embedding using various processes (e.g., processes based on the first target function, processes based on the second target function, processes based on the Moore-Penrose pseudoinverse, processes based on any other function, etc.), and may be stored in connection with the inverse neural embedding. An indication (e.g., identifier, name, etc.) of the processes used to generate each particular version may be stored in connection with that particular version.

In step 375, the computing device may cause output of inverse neural embedding(s) and/or inverse feature set(s). For example, the computing device may cause output of one or more of the inverse neural embedding(s) and/or the inverse feature set(s) as stored in step 373. In some examples, the computing device may send the data to another device (e.g., a device associated with an administrator, a user device, etc.). In some examples, the computing device may cause display (e.g., via a user interface) of inverse neural embeddings and their corresponding inverse feature sets (for example, in a similar manner as the display of data samples and forward neural embeddings generated based on the data samples as described in connection with step 315). For example, the computing device may list, on a user interface, each inverse neural embedding and version(s) of the inverse feature set corresponding to the inverse neural embedding. An indication of the processes used to generate each version of the inverse feature set may be displayed in connection with that version of the inverse feature set. In some examples, the computing device may cause display of inverse neural embeddings and inverse feature sets corresponding to the inverse neural embeddings, with indications of spatial relationships among the inverse neural embeddings. For example, a coordinate system defining a three-dimensional space may be displayed. One or more points representing one or more inverse neural embeddings may be displayed in the three-dimensional space. The position of each point of the one or more points in the three-dimensional space may be based on the inverse neural embedding represented by the point. The data (e.g., an inverse neural embedding, version(s) of an inverse feature set for the inverse neural embedding, and/or an indication of the processes used to generate each version of the version(s) of the inverse feature set) for each point may be displayed together with the point, or upon activating (e.g., clicking, hovering over, etc.) the point. More details regarding a display of inverse neural embeddings and/or inverse feature sets are described below in connection with FIG. 5.

In some examples, the computing device may perform processes to determine (e.g., estimate, construct, etc.) a data sample based on an inverse feature set generated for a particular inverse neural embedding. For example, if the inverse feature set is based on a corpus of constituent elements that each may comprise a word for forming sentences, the computing device may perform processes to determine (e.g., estimate, construct, etc.) a data sample based on the inverse feature set (which may indicate what constituent element(s) and how many instances of each of the constituent element(s) may be included in the data sample) and/or rules associated with the data sample, such as grammar, idiom, etc. In some examples, the corpus of constituent elements (e.g., as discussed in connection with step 303) may comprise a plurality of constituent elements, wherein each constituent element of the plurality of constituent elements may comprise an ordered sequence of multiple (e.g., 2, 3, 4, etc.) subparts. Each subpart may be used as a basis for forming data samples. For example, a subpart for data samples of a sentence type may comprise a word that may be used to form sentences, and a constituent element may comprise an ordered sequence of words. Based on such a corpus of constituent elements, an inverse feature set may be similarly generated for a particular inverse neural embedding, as described herein. The computing device may perform processes to determine (e.g., estimate, construct, etc.) a data sample, based on the inverse feature set, rules associated with the data sample, and/or the corpus of constituent elements with ordered sequences of subparts. For example, if the subpart at the end of the sequence of a first constituent element indicated, by the inverse feature set, to be included in the data sample corresponds to the subpart at the beginning of the sequence of a second constituent element indicated, by the inverse feature set, to be included in the data sample, then it may be determined that the first constituent element may precede the second constituent element in the data sample, and/or that the first constituent element may be appended to by the second constituent element for determining the data sample.

Figure 4:
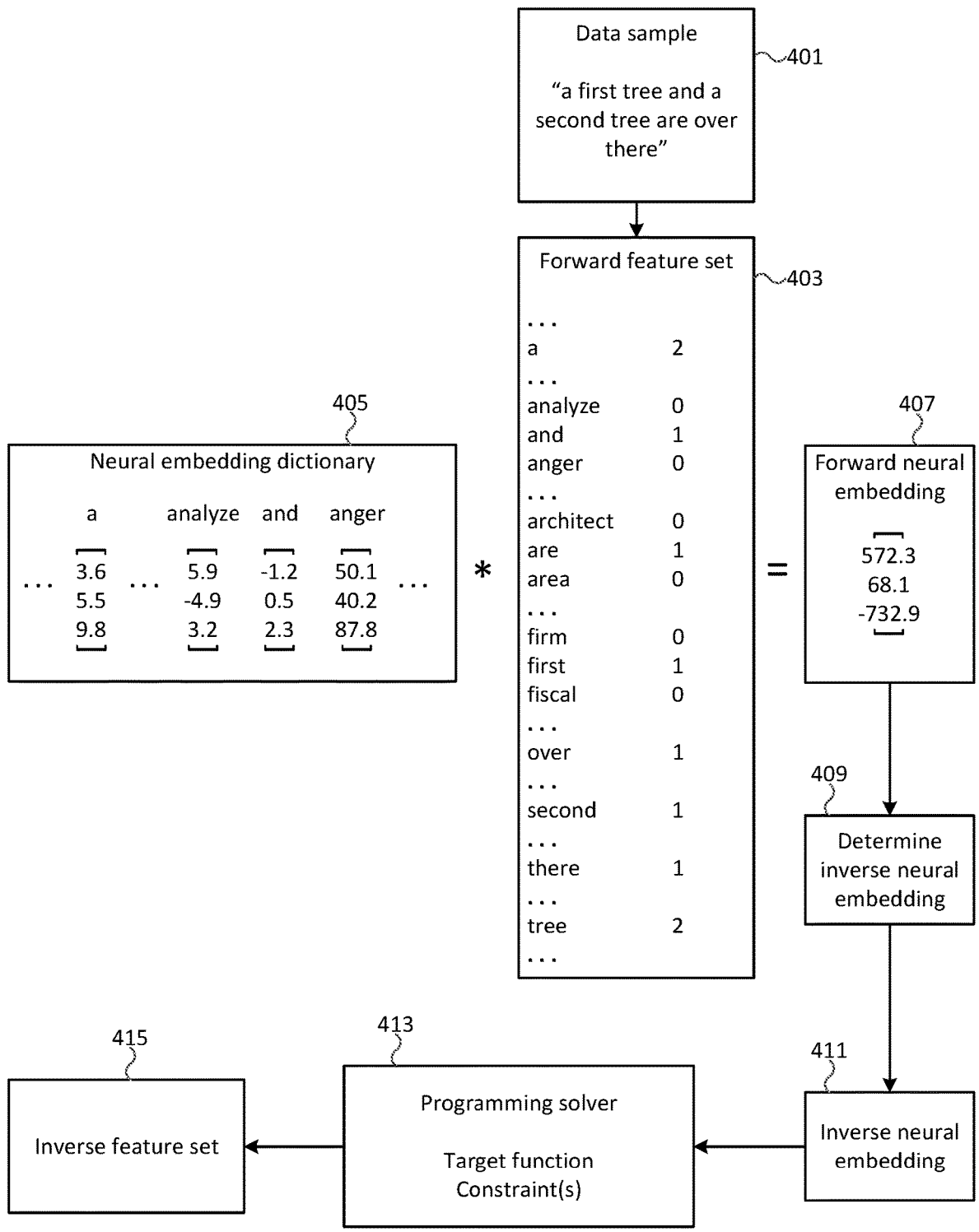
FIG. 4 is a schematic diagram showing an example process for inverting neural embeddings in accordance with one or more aspects described herein.

FIG. 4 is a schematic diagram showing an example process for inverting neural embeddings in accordance with one or more aspects described herein. The process may be implemented by one or more computing devices (e.g., the computing device as described in connection with FIG. 2). The process may be implemented or performed, for example, by one or more of the devices as described in connection with FIG. 1. The process may be distributed across multiple computing devices, or may be performed by a single computing device.

A data sample 401 may, for example, comprise a sentence "a first tree and a second tree are over there." A forward feature set 403 may be generated based on the data sample 401. The forward feature set 403 may be based on a corpus of constituent elements, such as a corpus of words {a, analyze, and, anger, . . . }. The forward feature set 403 may indicate, for each constituent element of the corpus of constituent elements, a quantity (e.g., 0, 1, 2, 3, etc.) of instances of the constituent element being present in the data sample 401. For example, the forward feature set 403 may comprise a plurality of non-negative integer values {2, 0, 1, 0, . . . }, because the word "a" is present two (2) times in the data sample 401, the word "analyze" is not present in the data sample 401, the word "and" is present one (1) time in the data sample 401, the word "anger" is not present in the data sample 401, and so forth.

A neural embedding dictionary 405 may, for example, be generated for the data sample 401. The neural embedding dictionary 405 may comprise, for example, a plurality of neural embeddings for the corpus of constituent elements. Each constituent element of the corpus of constituent elements may have a corresponding neural embedding in the neural embedding dictionary 405. For example, the neural embedding dictionary 405 may indicate that the neural embeddings for the constituent element words "a," "analyze," "and," "anger," etc., are respectively vectors [3.6, 5.5, 9.8], [5.9, −4.9, 3.2], [−1.2, 0.5, 2.3], [50.1, 40.2, 87.8], etc.

A forward neural embedding 407 for the data sample 401 may be determined and/or generated, based on applying the neural embedding dictionary 405 to the forward feature set 403. For example, a computing device may multiply the neural embedding dictionary 405 (e.g., as a matrix) and the forward feature set 403 (e.g., as a matrix). The result of the multiplication may be the forward neural embedding 407. For example, the forward neural embedding 407 may comprise a vector [572.3, 68.1, −732.9], corresponding to the sum of [3.6, 5.5, 9.8] multiplied by 2 (e.g., for the word "a"), [5.9, −4.9, 3.2] multiplied by 0 (e.g., for the word "analyze"), [−1.2, 0.5, 2.3] multiplied by 1 (e.g., for the word "and"), [50.1, 40.2, 87.8] multiplied by 0 (e.g., for the word "anger"), and so forth.

In process 409, the computing device may determine an inverse neural embedding associated with the forward neural embedding 407. The determination of the inverse neural embedding may be, for example, based on the forward neural embedding 407. The determination of the inverse neural embedding may be performed in various manners as described herein (e.g., in connection with steps 351, 353, 355, 357, 359, 361 (FIG. 3B)).

An inverse neural embedding 411 may be determined in the process 409. The inverse neural embedding 411 may be in a similar format as the forward neural embedding 407. An inverse feature set 415 may be determined and/or generated via a programming solver 413 based on the inverse neural embedding 411. The inverse feature set 415 may be in a similar format as the forward feature set 403. The inverse neural embedding 411 may be input to the programming solver 413. The programming solver 413 may generate, based on the inverse neural embedding 411, the inverse feature set 415. The programming solver 413 may process a target function and one or more constraints for the target function, as described herein. The target function and/or constraint(s) may be formulated with the inverse neural embedding 411. The programming solver 413 may be configured to determine the inverse feature set 415, based on solving optimization programs based on the target function and/or constraint(s).

Figure 5:
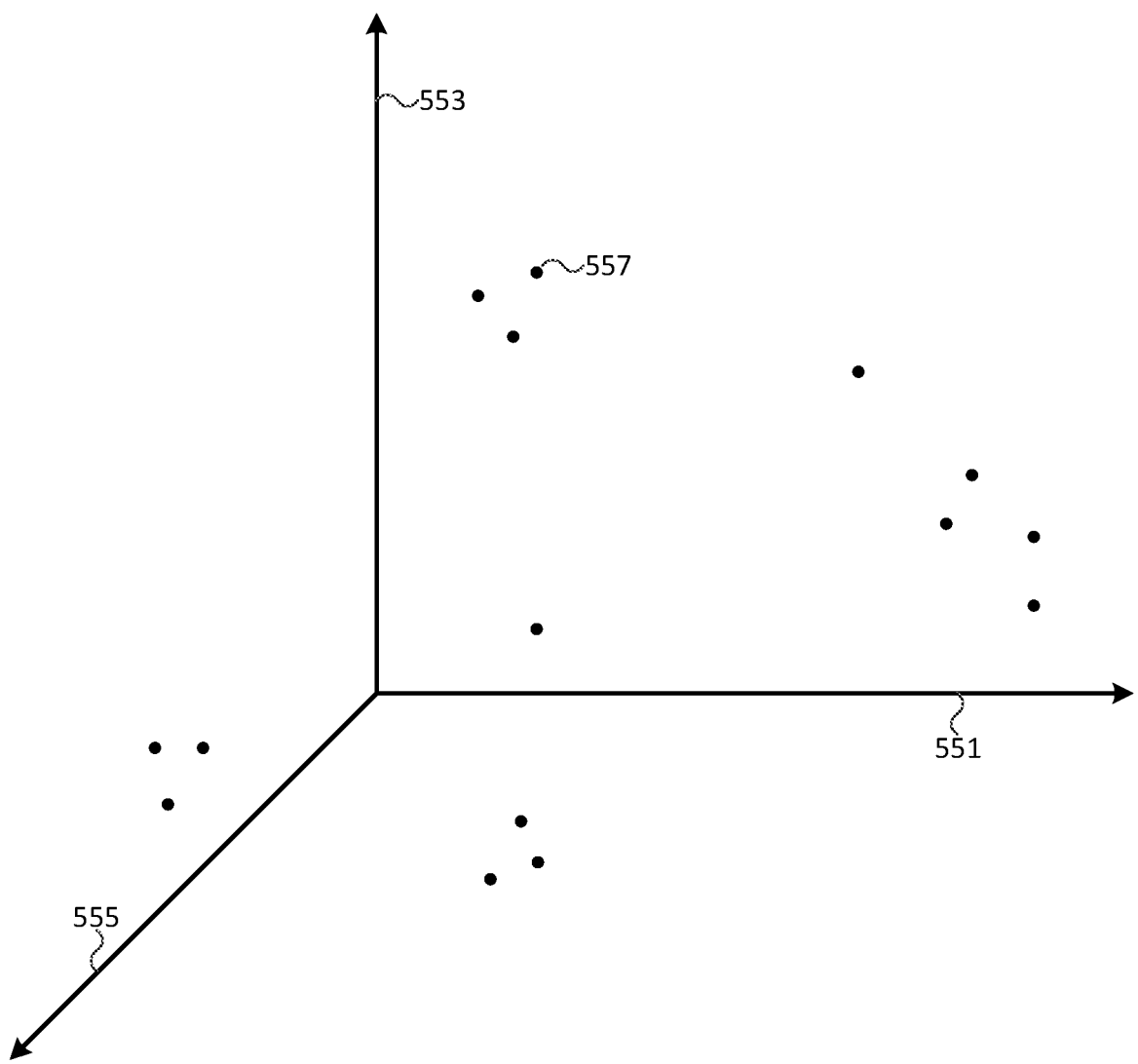
FIG. 5 shows an example of a display of indications of neural embeddings in accordance with one or more aspects described herein.

FIG. 5 shows an example of a display of indications of neural embeddings in accordance with one or more aspects described herein. The example display may comprise one or more axes (e.g., axis 551, axis 553, axis 555, etc.) and one or more points indicating neural embeddings (e.g., point 557). The position of a point in the space as defined by the axis 551, the axis 553, and the axis 555 may be determined based on the neural embedding vector represented by the point. For example, if the neural embedding vector represented by a point is [572.3, 68.1, −732.9], the location of the point in the space may be a location having a value of 572.3 on the axis 551, having a value of 68.1 on the axis 553, and having a value of −732.9 on the axis 555.

The display of indications of neural embeddings may be performed via an interactive user interface of a computing device. The points displayed in the space may represent forward neural embedding(s) and/or inverse neural embedding(s). For example, one or more points displayed in the space may represent forward neural embedding(s) (and their corresponding data samples). In some examples, one or more points displayed in the space may represent inverse neural embedding(s) (and their corresponding inverse feature set(s)). The data (e.g., a pair of a data sample and a corresponding forward neural embedding, or a collection of an inverse neural embedding, version(s) of an inverse feature set for the inverse neural embedding, and/or an indication of the processes used to generate each version of the version(s) of the inverse feature set) for each point may be displayed together with the point, or upon activating (e.g., clicking, hovering over, etc.) the point.

In some examples, the user interface displaying indications of neural embeddings may be configured to receive user input corresponding to selecting a position in the space. The selected position may indicate, for example, an inverse neural embedding for generating an inverse feature set. The user interface may be configured to receive user input corresponding to entering coordinates indicating a position in the space and/or indicating an inverse neural embedding for generating an inverse feature set. The user interface may be configured to receive user input corresponding to selecting one or more points displayed in the space and requesting the computing device to determine inverse neural embedding(s) based on the selected one or more points (e.g., by interpolating, extrapolating, determining based on proximity to the selected point(s), etc.), as described herein. The user interface may be configured to receive user input corresponding to selecting one or more areas of interest from the space. The computing device may be configured to determine, from the selected one or more areas of interest, inverse neural embedding(s) for generating inverse feature set(s). The user interface may be configured to receive any other type of user input as described herein.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although examples are described above, features and/or steps of those examples may be combined, divided, omitted, rearranged, revised, and/or augmented in any desired manner. For example, any of the various processes described above may be performed in alternative sequences and/or in parallel (e.g., on different computing devices). Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting. Accordingly, the scope of the invention should be determined not by the embodiments illustrated, but by the appended claims and their equivalents.

What is claimed is:

1. A method comprising:
   receiving, by a computing device, a plurality of data samples;
   generating a plurality of forward neural embeddings for the plurality of data samples, wherein generating a forward neural embedding, of the plurality of forward neural embeddings, for a data sample of the plurality of data samples comprises:
      determining a forward feature set for the data sample, wherein the forward feature set comprises a plurality of elements having non-negative integer values; and
      based on applying a dictionary to the forward feature set, determining the forward neural embedding for the data sample, wherein the forward neural embedding comprises a vector of one or more values;
   determining one or more inverse neural embeddings associated with the plurality of forward neural embeddings;
   generating one or more inverse feature sets for the one or more inverse neural embeddings, wherein generating an inverse feature set, of the one or more inverse feature sets, for an inverse neural embedding of the one or more inverse neural embeddings comprises:
      determining a target function comprising a variable corresponding to the inverse feature set for the inverse neural embedding, wherein the target function comprises a 2-norm of a result of subtracting the inverse neural embedding by a product of the dictionary and the variable; and
      based on minimizing the target function under a constraint that each element of a plurality of elements of the inverse feature set comprises a non-negative integer value, determining the inverse feature set for the inverse neural embedding; and
   causing output of the one or more inverse feature sets for the one or more inverse neural embeddings.

2. The method of claim 1, wherein the plurality of data samples comprise a plurality of words, a plurality of sentences, a plurality of documents, a plurality of utterances, a plurality of video segments, or a plurality of images.

3. The method of claim 1, wherein the dictionary comprises a plurality of vectors, wherein each vector of the plurality of vectors corresponds to a different element of the plurality of elements of the forward feature set, and wherein the applying the dictionary to the forward feature set comprises aggregating the plurality of vectors respectively multiplied by the plurality of corresponding elements of the forward feature set.

4. The method of claim 1, further comprising generating the dictionary based on:
   determining a vector representation for each word in a corpus of words; and
   adding, to the dictionary, the vector representations for the corpus of words.

5. The method of claim 1, wherein the determining the one or more inverse neural embeddings associated with the plurality of forward neural embeddings comprises:
   determining an embedding space associated with the plurality of forward neural embeddings; and
   based on selecting one or more positions within the embedding space, determining the one or more inverse neural embeddings.

6. The method of claim 1, wherein the determining the one or more inverse neural embeddings associated with the plurality of forward neural embeddings comprises:
   based on proximity to one or more forward neural embeddings of the plurality of forward neural embeddings, determining the one or more inverse neural embeddings.

7. The method of claim 1, wherein the determining the one or more inverse neural embeddings associated with the plurality of forward neural embeddings comprises:
   interpolating or extrapolating based on two or more forward neural embeddings of the plurality of forward neural embeddings.

8. The method of claim 1, wherein:
   the target function further comprises a 2-norm of the variable; and
   the minimizing the target function is under a further constraint that a 2-norm of a result of subtracting the inverse neural embedding by the product of the dictionary and the variable is less than or equal to a boundary.

9. The method of claim 1, wherein the minimizing the target function is via a mixed-integer quadratic programming solver.

10. An apparatus comprising:
    one or more processors; and
    memory storing instructions that, when executed by the one or more processors, cause the apparatus to:
       receive a plurality of data samples;
       generate a plurality of forward neural embeddings for the plurality of data samples, wherein the instructions, when executed by the one or more processors, cause the apparatus to generate a forward neural embedding, of the plurality of forward neural embeddings, for a data sample of the plurality of data samples by:
          determining a forward feature set for the data sample, wherein the forward feature set comprises a plurality of elements having non-negative integer values; and
          based on applying a dictionary to the forward feature set, determining the forward neural embedding for the data sample, wherein the forward neural embedding comprises a vector of one or more values;
       determining an embedding space associated with the plurality of forward neural embeddings;

based on selecting one or more positions within the embedding space, determining one or more inverse neural embeddings;

generate one or more inverse feature sets for the one or more inverse neural embeddings, wherein the instructions, when executed by the one or more processors, cause the apparatus to generate an inverse feature set, of the one or more inverse feature sets, for an inverse neural embedding of the one or more inverse neural embeddings by:

determining a target function comprising a variable corresponding to the inverse feature set for the inverse neural embedding, wherein the target function comprises a 2-norm of a result of subtracting the inverse neural embedding by a product of the dictionary and the variable; and based on minimizing the target function under a constraint that each element of a plurality of elements of the inverse feature set comprises a non-negative integer value, determining the inverse feature set for the inverse neural embedding; and cause output of the one or more inverse feature sets for the one or more inverse neural embeddings.

11. The apparatus of claim 10, wherein the instructions, when executed by the one or more processors, further cause the apparatus to generate the dictionary based on:

determining a vector representation for each word in a corpus of words; and adding, to the dictionary, the vector representations for the corpus of words.

12. The apparatus of claim 10, wherein:

the target function further comprises a 2-norm of the variable; and the minimizing the target function is under a further constraint that a 2-norm of a result of subtracting the inverse neural embedding by the product of the dictionary and the variable is less than or equal to a boundary.

13. The apparatus of claim 10, wherein the minimizing the target function is via a mixed-integer quadratic programming solver.

14. The apparatus of claim 10, wherein the plurality of data samples comprise a plurality of words, a plurality of sentences, a plurality of documents, a plurality of utterances, a plurality of video segments, or a plurality of images.

15. The apparatus of claim 10, wherein the instructions, when executed by the one or more processors, further cause the apparatus to determine the one or more inverse neural embeddings associated with the plurality of forward neural embeddings by:

based on proximity to one or more forward neural embeddings of the plurality of forward neural embeddings, determining the one or more inverse neural embeddings.

16. The apparatus of claim 10, wherein the instructions, when executed by the one or more processors, further cause the apparatus to determine the one or more inverse neural embeddings associated with the plurality of forward neural embeddings by:

interpolating or extrapolating based on two or more forward neural embeddings of the plurality of forward neural embeddings.

17. A non-transitory machine-readable medium storing instructions that, when executed by one or more processors, cause the one or more processors to perform steps comprising:

receiving a plurality of data samples;

generating a plurality of forward neural embeddings for the plurality of data samples, wherein generating a forward neural embedding, of the plurality of forward neural embeddings, for a data sample of the plurality of data samples comprises:

determining a forward feature set for the data sample, wherein the forward feature set comprises a plurality of elements having non-negative integer values; and based on applying a dictionary to the forward feature set, determining the forward neural embedding for the data sample, wherein the forward neural embedding comprises a vector of one or more values;

based on proximity to one or more forward neural embeddings of the plurality of forward neural embeddings, determining one or more inverse neural embeddings;

generating one or more inverse feature sets for the one or more inverse neural embeddings, wherein generating an inverse feature set, of the one or more inverse feature sets, for an inverse neural embedding of the one or more inverse neural embeddings comprises:

determining a target function comprising a variable corresponding to the inverse feature set for the inverse neural embedding, wherein the target function comprises a 2-norm of a result of subtracting the inverse neural embedding by a product of the dictionary and the variable; and based on minimizing the target function under a constraint that each element of a plurality of elements of the inverse feature set comprises a non-negative integer value, determining the inverse feature set for the inverse neural embedding; and causing output of the one or more inverse feature sets for the one or more inverse neural embeddings.

18. The non-transitory machine-readable medium of claim 17, wherein the instructions, when executed by the one or more processors, further cause the one or more processors to perform steps comprising generating the dictionary based on:

determining a vector representation for each word in a corpus of words; and adding, to the dictionary, the vector representations for the corpus of words.

19. The non-transitory machine-readable medium of claim 17, wherein:

the target function further comprises a 2-norm of the variable; and the minimizing the target function is under a further constraint that a 2-norm of a result of subtracting the inverse neural embedding by the product of the dictionary and the variable is less than or equal to a boundary.

20. The non-transitory machine-readable medium of claim 17, wherein the minimizing the target function is via a mixed-integer quadratic programming solver.

* * * * *